United States Patent Office 3,657,226
Patented Apr. 18, 1972

3,657,226
DERIVATIVES OF 2H-PYRAN-3(6H)-ONES AND PREPARATION THEREOF
Yvon Lefebvre, Pierrefonds, Quebec, Canada, assignor to American Home Products Corporation, New York, N.Y.
No Drawing. Continuation-in-part of application Ser. No. 5,883, Jan. 26, 1970, which is a continuation-in-part of application Ser. No. 748,196, July 29, 1968. This application Oct. 5, 1970, Ser. No. 78,196
Int. Cl. C07c 173/00
U.S. Cl. 260—239.55 R
25 Claims

ABSTRACT OF THE DISCLOSURE

There are disclosed herein 24-hydroxy-, 24-acyloxy- and 24 - alkoxy-17β,24-epoxy-21-norcholane 3,20-dione and 17β,24 - epoxy-19,21-dinorcholane-3,20-dione compounds and their corresponding cholanic acid γ-lactones with optional double bonds at positions 4,5 and 22,23 as well as their corresponding 11-hydroxy- and 11-keto-derivatives thereof. The compounds have antigonadotrophic activity and methods for their preparation and use are also disclosed.

This application is a continuation-in-part of my U.S. patent application Ser. No. 5,883, filed Jan. 26, 1970, which is a continuation-in-part of my U.S. patent application Ser. No. 748,196, filed July 29, 1968 now U.S. Pat. No. 3,547,912.

SUMMARY OF THE INVENTION

This invention relates to new and useful derivatives of 17β,24-epoxy-21-norcholanes, to processes used for their preparation and to intermediates used in these processes.

The 17β,24-epoxy-21-norcholanes of this invention may be represented by general Formula I

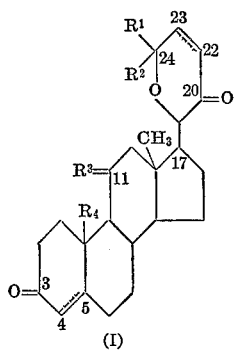

(I)

in which $R^1$ and $R^2$ together represent a ketonic oxygen or $R^1$ represents hydrogen and $R^2$ represents the hydroxyl group, an esterified hydroxyl group in which the ester-forming group is an aliphatic acid group containing 2 to 7 carbon atoms, or an alkoxy group containing 1 to 3 carbon atoms, $R^3$ represents two atoms of hydrogen, a hydroxyl group and a hydrogen or a ketonic oxygen, $R^4$ represents a hydrogen or a methyl; and an optional double bond, signified by a dotted line, may be present at position 4,5 or position 22,23 or at both these positions.

The 17β,24-epoxy-21-norcholanes of this invention possess pharmacologic properties; for example, antigonadotrophic activity. These properties together with their low order of toxicity render the compounds of this invention as useful pharmacologic agents.

DETAILED DESCRIPTION OF THE INVENTION

The antigonadotrophic activity of the 17β,24-epoxy-21-norcholanes of this invention may be demonstrated in standard pharmacological tests, for example, in the test described by C. Revesz and C. I. Chappel, J. Reprod. Fert., 12, 473 (1966).

When the above 17β,24-epoxy-21-norcholane derivatives are employed as antigonadotrophic agents in warm-blooded animals, for example, rats, they may be administered orally, alone or in tablets combined with pharmacologically acceptable excipients, such as starch, milk sugar and so forth. They may also be administered orally in the form of solutions in suitable vehicles such as vegetable oils.

The dosage of these 17β,24-epoxy-21-norcholane derivatives will vary with the particular compound chosen and form of administration. Furthermore, it will vary with the particular host under treatment. Generally, the compounds of this invention are administered at a concentration level that affords the desired pharmacological effect without any deleterious side effects. Those effective concentration levels are usually obtained with a therapeutic range of 0.1 to 100 mg. per kilo per day with a preferred range of 0.5 to 50 mg. per kilo per day.

The preferred starting materials for the compounds of this invention are commercially available steroids of a general, well known type; for example, see L. F. Fieser and M. Fieser, "Steroids," Reinhold Publishing Corporation, New York, 1959: These starting materials may be represented by general Formula II

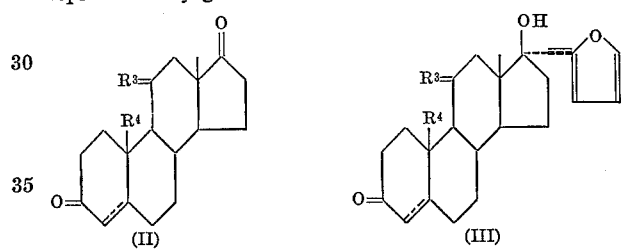

(II)            (III)

in which $R^3$ and $R^4$ are as defined above, with an optional double bond at position 4,5 as signified by the dotted line.

These starting materials are converted to their corresponding 17α-[2'-furyl]-17β-hydroxy steroids of general Formula III by treatment with 2-furyllithium. During the addition reaction the 3-ketone is protected. Such temporary protection is advantageously afforded by a ketal, enol ether or enamine group. For example, a pyrrolidinyl enamine may be conveniently used to protect the 3-ketone of a Δ⁴-3-ketosteroid and the saturated 3-ketosteroids may be protected by a 3,3-dimethoxy ketal. After the addition of 2-furyllithium to the 17-ketone, the temporary protecting group is conveniently removed by subjecting the reaction product to midly acidic conditions, for example, sodium acetate in acetic acid solution or hydrochloric acid in methanol dilute solution. Preferred conditions for the addition of the 2-furyllithium include the use of an inert solvent, for example, ether, toluene, tetrahydrofuran or hexane, a reaction temperature range of 0° C. to room temperature and reaction times of 15 minutes to three days. However under these preferred conditions an 11-ketone if present will react to some extent with the 2-furyllithium. In this case a shorter reaction time of five to 30 minutes, preferably 15 minutes, preferentially yields the desired 3,11-diketo-17α[2'-furyl]-17β-hydroxysteroid. 2-furyllithium is prepared by the action of n-butyllithium upon 2-bromofuran in ether at room temperature. Alternatively, 2-furyllithium is also obtained by the action of n-butyllithium upon furan in ether at room temperature. In turn, 2-bromofuran is obtained by decarboxylation of 5-bromo-2-furoic acid by the method of A. F. Shepard et al., J. Am. Chem. Soc., 52, p. 2093 (1930).

The above 17α-[2'-furyl]-17β-hydroxy steroids are treated with one to two molar equivalents of a hypohalous acid such as, hypobromous or hypochlorous acid or a reagent capable of furnishing the elements of a hypohalous acid upon contact with water. Preferred reagents for this reaction are certain N-haloimides or N-haloamides, for example, N-bromo- or N-chlorosuccinimide, or N-chloro- or N-bromoacetamide, used with or without small amounts of an acid, preferably perchloric acid; or the reaction may be carried out with an aqueous solution of an alkali metal salt of a hypohalite in contact with acid, such as, for example, sodium hypochlorite and acetic acid. Water must be present and preferred organic solvents include aliphatic and cyclic ethers, such as, for example, diethyl ester, dioxane or tetrahydrofuran; lower aliphatic ketones such as, for example, acetone or methyl ethyl ketone; aromatic hydrocarbons such as, for example, benzene, toluene, or xylene; lower aliphatic esters, such as, for example, the lower alkyl acetates, lower aliphatic carboxylic acids, such as, for example, acetic or butyric acid; lower aliphatic halogenated hydrocarbons such as, for example, chloroform, methylene chloride, or ethylene dichloride; and certain lower aliphatic alcohols such as, for example, methanol and t-butanol. The time of reaction may extend from three minutes to twenty-four hours, and reaction conditions are preferably chosen so as to complete the reaction within one-half hour. The temperature range at which the reactions may be carried out is from 0°–50° C., with temperatures of about 20–30° C. being the preferred range.

Alternatively, the above 17α-[2'-furyl]-17β-hydroxy steroids are treated with an organic peracid, such as, for example, peracetic acid, perbenzoic acid, monoperphthalic acid, m-chloroperbenzoic acid, and p-nitroperbenzoic acid. The organic peracid utilized may range in amount from approximately 1.1 molar equivalent to 100 molar equivalents, per mole of steroid starting material. Any practical solvent inert to the peracid may be employed. Aliphatic and cyclic ethers, such as, for example, diethyl ether, dioxane, or tetrahydrofuran; lower aliphatic ketones such as, for example, acetone or methyl ethyl ketone; aromatic hydrocarbons such as, for example, benzene, toluene, or xylene; lower aliphatic alcohols, such as, for example, methanol, ethanol, isopropanol, or t-butanol; lower aliphatic acids and their lower alkyl esters such as, for example, acetic acid, ethyl acetate, or butyl acetate; and halogenated hydrocarbons such as, for example, chloroform, methylene chloride, carbon tetrachloride, or ethylene dichloride, are all useful solvents. The time of reaction may extend from 15 minutes to 60 hours, with the preferred range being from one-half to twenty-four hours.

In this manner, when starting with the 17α-[2'-furyl]-17β-hydroxy steroids of general Formula III, described above, the corresponding 17β,24-epoxy-21-norcholane derivatives of Formula I in which $R^1$ is hydrogen, $R^2$ is the hydroxyl group, $R^3$ and $R^4$ are as defined above, with an optional double bond at positions 4,5 and a double bond at position 22,23 are obtained.

Treatment of the latter 17β,21-epoxy-21-norcholane derivatives of Formula I in which $R^2$ is the hydroxyl group with an appropriate acid anhydride or acid halide in pyridine affords the corresponding 24-acylated derivatives of Formula I in which $R^1$ is hydrogen, $R^2$ is an esterified hydroxyl group in which the ester-forming group is an aliphatic acid containing two to seven carbon atoms, $R^3$ and $R^4$ are as defined above, with an optional double bond at position 4,5 and a double bond at position 22,23.

Furthermore, treatment of the same latter 17β,24-epoxy-21-norcholane derivatives of Formula I in which $R^2$ is the hydroxyl group with an appropriate lower alkanol in the presence of an acid catalyst, for example, perchloric acid, affords the corresponding 24-ethers of Formula I in which $R^1$ is hydrogen, $R^2$ is a lower alkyl, $R^3$ and $R^4$ are as defined above, with an optional double bond at position 4,5 and a double bond at position 22,23.

Still furthermore, treatment of the same latter 17β,24-epoxy - 21 - norcholane derivatives of Formula I in which $R^2$ is the hydroxyl group with a suitable oxidizing agent affords the corresponding ketolactones of Formula I in which $R^1$ and $R^2$ together represent a ketonic oxygen, $R^3$ and $R^4$ are as defined above, with an optional double bond at position 4,5 and a double bond at position 22, 23. In the case where these latter 17β,24 - epoxy - 21-norcholane derivatives of Formula I in which $R^2$ is the hydroxyl group and $R^3$ represents two atoms of hydrogen or a ketonic oxygen, then the suitable oxidizing agent may be the hexavalent chromium ion, which may be practically employed, for example, in the form of chromic acid in the presence of sulfuric acid and water, a modification described by A. Bowers et al., J. Chem. Soc., 2548 (1953). However, in the case where these latter 17β,24-epoxy - 21 - norcholane derivatives of Formula I in which $R^2$ is the hydroxyl group and $R^3$ represents a hydroxyl group, and a hydrogen hexavalent chromium is not a preferred, suitable oxidizing agent since simultaneous oxidation of the two hydroxyl groups may occur. In this latter case an oxidizing agent for converting allylic alcohols to α,β-unsaturated ketones is most suitable; for example, the oxidizing agent, manganese dioxide.

For the preparation of the 17β,24 - epoxy - 21 - norcholanes of Formula I in which $R^1$ represents hydrogen and $R^2$ represents the hydroxyl group, an esterified hydroxyl group as defined above or an alkoxy group containing 1 to 3 carbon atoms, $R^3$ and $R^4$ are as defined in the first instance, with an optional double bond at position 4,5 and no double bond at position 22,23, the corresponding 17β,24 - epoxy - 21 - norcholanes of Formula I in which the double bond at position 22,23 is present, described above, may be reduced by hydrogenation in the presence of a noble metal catalyst, for example, palladium.

For the preparation of the 17β,24-epoxy-21-norcholanes of Formula I in which $R^1$ and $R^2$ together represent a ketonic oxygen, $R^3$ and $R^4$ are as defined in the first instance, with an optional double bond at position 4,5 and no double bond at position 22,23, the corresponding 17β,24-epoxy-21-norcholanes of Formula I in which the double bond at position 22,23 is present, described above, may be reduced in the presence of zinc and acetic acid.

The following examples will illustrate further this invention.

EXAMPLE 1

17α-[2'-furyl]-17β-hydroxy-5α-androstan-3-one
(III: $R^3$=$H_2$ and $R^4$=$CH_3$)

A mixture of 5α-androstane - 3,17 - dione (90 g.), methanol (1450 ml.) and p-toluenesulfonic acid (1.8 g.) is stirred for 2½ hours. Pyridine (5 ml.) is added and the solid that forms is collected by filtration yielding the ketal, 3,3-dimethoxy-5α-androstan - 17 - one. The filtrate is evaporated to dryness and the residue crystallized from methanol yielding more of the ketal. Both crops are crystallized together to give material suitable for further use.

A mixture of furan (100 ml.), ether (1000 ml.) and a 1.74 N ethereal solution of n-butyllithium (725 ml.) is stirred for one hour at room temperature. A solution of the 3,3 - dimethoxy - 5α - androstan - 17 - one, obtained above, in toluene (2430 ml.) is added and the reaction allowed to proceed for 18 hours. Ether is added, the solution washed with water, dried and evaporated yielding crude 3,3 - dimethoxy - 17α-[2'-furyl]-5α-androstan-17-ol.

A solution of this crude furyl derivative in acetone (1425) is stirred for 1½ hours in the presence of oxalic acid (47.5 g.). The acid is neutralized by the addition of a saturated solution of potassium carbonate. The solvent is evaporated and the residue taken up in ether-methylene chloride. The organic solution is further washed with water, dried and evaporated. The residue is crystallized from ether and then methylene chloride-methanol to give the title compound, M.P. 213–215° C., [α]_D +44° (CHCl_3).

In the same manner but using an equivalent amount of 5β-androstane - 3,17 - dione instead of 5α-androstane-3,17-dione, 17α-[2′-furyl]-17β-hydroxy - 5β - androstan-3-one, M.P. 135–136° C., [α]_D +44° (CHCl_3), may be prepared.

By following the procedure of Example 1 but using an equivalent amount of the appropriate starting materials listed in Table 1 instead of 5α-androstane-3,17-dione, the corresponding 17α-[2′-furyl] - 17β - hydroxy steroids, listed in Table 1, may be obtained.

TABLE 1

| Ex. | Starting material | Corresponding 17α-[2′-furyl]-17β-hydroxy steroid |
|---|---|---|
| 2 | 11α-hydroxy-5α-androstane-3,17-dione. | 17α-[2′-furyl]-11α,17β-dihydroxy-5α-androstan-3-one. |
| 3 | 11α-hydroxy-5β-androstane-3,17-dione. | 17α-[2′-furyl]-11α,17β-dihydroxy-5β-androstan-3-one. |
| 4 | 11β-hydroxy-5α-androstane-3,17-dione. | 17α-[2′-furyl]-11β,17β-dihydroxy-5α-androstan-3-one. |
| 5 | 11β-hydroxy-5β-androstane-3,17-dione. | 17α-[2′-furyl]-11β,17β-dihydroxy-5β-androstan-3-one. |
| 6 | 5α-estrane-3,17-dione. | 17α-[2′-furyl]-17β-hydroxy-5α-estran-3-one. |
| 7 | 5β-estrane-3,17-dione. | 17α-[2′-furyl]-17β-hydroxy-5β-estran-3-one. |
| 8 | 11α-hydroxy-5α-estrane-3,17-dione. | 17α-[2′-furyl]-11α,17β-dihydroxy-5α-estran-3-one. |
| 9 | 11α-hydroxy-5β-estrane-3,17-dione. | 17α-[2′-furyl]-11α,17β-dihydroxy-5β-estran-3-one. |
| 10 | 11β-hydroxy-5α-estrane-3,17-dione. | 17α-[2′-furyl]-11β,17β-dihydroxy-5α-estran-3-one. |
| 11 | 11β-hydroxy-5β-estrane-3,17-dione. | 17α-[2′-furyl]-11β,17β-dihydroxy-5β-estran-3-one. |

By following the procedure of Example 1 but using an equivalent amount of the appropriate starting materials listed in Table II instead of 5α-androstane-3,17-dione and a reaction time of 15 minutes instead of 18 hours for the addition reaction with furyllithium, the corresponding 17α-[2′-furyl]-17β-hydroxy steroids, listed in Table II, may be obtained.

TABLE II

| Ex. | Starting material | Corresponding 17α-[2′-furyl]-17β-hydroxy steroid |
|---|---|---|
| 12 | 5α-androstane-3,11,17-trione | 17α-[2′-furyl]-17β-hydroxy-5α-androstane-3,11-dione. |
| 13 | 5β-androstane-3,11,17-trione | 17α-[2′-furyl]-17β-hydroxy-5β-androstane-3,11-dione. |
| 14 | 5α-estrane-3,11,17-trione | 17α-[2′-furyl]-17β-hydroxy-5α-estrane-3,11-dione. |
| 15 | 5β-estrane-3,11,17-trione | 17α-[2′-furyl]-17β-hydroxy-5β-estrane-3,11-dione. |

EXAMPLE 16

17α - [2′ - furyl] - 17β - hydroxyandrost - 4 - en - 3 - one (III: $R^3$=H, $R^4$=$CH_3$ and double bond at position 4,5)

Pyrrolidine (100 ml.) is added to a boiling solution of androst-4-ene-3,17-dione (100 g.) in methanol (1000 ml.). After cooling, the solid that had formed is filtered, washed with methanol and dried, yielding 3-[1-pyrrolidinyl]-androsta-3,5-dien-17-one.

A solution of furan (136 g.), ether (2200 ml.) and a 2.12 N ethereal solution of n-butyllithium (870 ml.) is stirred at room temperature for one hour. A solution of the enamine (110 g.), obtained above, in toluene (4400 ml.) is added and the mixture stirred overnight at room temperature. Ether and water are added. The organic solution is further washed to neutrality, dried and evaporated to dryness.

The crude product (130 g.) is dissolved in benzene (4000 ml.) and the solution refluxed for 4 hours in the presence of acetic acid (260 ml.), sodium acetate (390 g.) and water (390 ml.).

After cooling the solution is washed with a dilute sulfuric acid solution, sodium bicarbonate and water, dried and evaporated. The residue is treated twice with charcoal and crystallized from acetone-hexane giving the title compound, M.P. 192–193° C., [α]_D=99.3° (CHCl_3), $\lambda_{max.}^{EtOH}$ 225 mμ (ε=17,200) and 242 mμ (ε=17,500)

By following the procedure of Example 16 but using an equivalent amount of the appropriate starting material listed in Table III instead of androst-4-ene-3,17-dione, the corresponding 17α-[2′-furyl]-17β-hydroxy steroids, listed in Table III are obtained.

TABLE III

| Ex. | Starting material | Corresponding 17α-[2′-hydroxy]-17β-hydroxy steroid | M.P., ° C. |
|---|---|---|---|
| 17 | 11β-hydroxyandrost-4-ene-3,17-dione. | 17α-[2′-furyl]-11β,17β-dihydroxyandrost-4-en-3-one. | 179–180 |
| 18 | Estr-4-ene-3,17-dione | 17α-[2′-furyl]-17β-hydroxyestr-4-en-3-one. | 126–127 |

EXAMPLE 19

In the same manner as described for Example 16 but using an equivalent amount of 11α-hydroxyandrost-4-ene-3,17-dione, 11α - hydroxyestr - 4 - ene - 3,17 - dione or 11β - hydroxyestr - 4 - ene - 3,17 - dione instead of androst - 4 - ene - 3,17 - dione, 17α - [2′ - furyl]-11α,17β - dihydroxyandrost - 4 - en - 3 - one, 17α - [2′-furyl] - 11α,17β - dihydroxyestr - 4 - en - 3 - one and 17α-[2′ - furyl] - 11β,17β - dihydroxyestr - 4 - en - 3 - one may be obtained, respectively.

EXAMPLE 20

17α-[2′-furyl]-17β-hydroxyandrost-4-ene-3,11-dione (III: $R^3$=O, $R^4$=$CH_3$ and a double bond at position 4,5)

Pyrrolidine (118 ml.) is added to a boiling solution of androst-4-ene-3,11,17-trione (118 g.) in methanol (3180 ml.). The mixture is cooled and the solid collected. The solid is washed with methanol and dried, yielding 3-(1-pyrrolidinyl)-3-androsta-3,5-diene-11,17-dione.

A solution of furan (72 g.), ether (2500 ml.) and a 1.90 N ethereal solution of n-butyllithium (280 ml.) is stirred for one hour at room temperature. A solution of the enamine (132 g.), obtained above, in benzene (2500 ml.) is added and the mixture stirred for 15 minutes at 0° C. The reaction mixture is washed with water, dried and evaporated yielding crude 17α-[2′-furyl]-17β-hydroxy-3-(1-pyrrolidinyl)-androsta-3,5-dien-11-one.

This crude furyl derivative (125 g.) is dissolved in benzene (2500 ml.). The solution is refluxed for 4 hours in the presence of sodium acetate (275 g.), water (375 ml.) and acetic acid (250 ml.). The cooled solution is washed with dilute sulfuric acid, sodium bicarbonate and water to neutrality. After drying the solution, the solvent is removed under reduced pressure. The residue is crystallized from acetone, containing a small quantity of hexane to yield the title compound, M.P. 232–234° C., [α]_D +160.3° (CHCl_3).

EXAMPLE 21

In the same manner as described for Example 20 but using an equivalent amount of estr-4-ene-3,11,17-trione instead of androst-4-ene-3,11,17-trione, 17α-[2′-furyl]-17β-hydroxyestr-4-ene-3,11-dione may be obtained.

EXAMPLE 22

17β,24-epoxy - 24 - hydroxy-21-nor-5α,17α-chol-22-ene-3,20-dione (I: $R^1$=H, $R^2$=OH, $R^3$=$H_2$, $R^4$=$CH_3$ and a double bond at position 22,23).

Procedure A.—A solution of m-chloroperbenzoic acid (87%—39.5 g.) in chloroform (1290 ml.) is added at room temperature over a period of 20 minutes to a solution of 17α-[2′-furyl]-17β-hydroxy-5α-androstan - 3 - one (64.5 g.), prepared as described in Example 1, in chloroform (1290 ml.). After stirring for 4½ hours, the solution is washed thoroughly with sodium bicarbonate and water, dried and evaporated to dryness. The residue is chromatographed on silica gel. The product is eluted with 25% ethyl acetate-benzene. Crystallization from acetone affords the title compound, M.P. 216–218° C., $[\alpha]_D = +69.3°$ (CHCl$_3$)

$\lambda_{max.}^{EtOH}$ 216 m$\mu$ ($\epsilon = 8780$) and 350 m$\mu$ ($\epsilon = 91$)

Procedure B.—The title compound may be obtained also in the following manner. N-bromosuccinimide (1.0 g.) is added by portions to a mixture of 17$\alpha$-[2'-furyl]-17$\beta$-hydroxy-5$\alpha$-androstan-3-one (2.0 g.), prepared as described in Example 1, in methanol (216 ml.) and water (21 ml.). The mixture is stirred for five minutes. Water is added; the mixture is extracted with ether and the ether solution is washed with water, dried and evaporated. Work-up of the resultant residue in the same manner is described above for Procedure A affords the title compound, identical to the product of Procedure A.

In the same manner as described in above Procedures A or B but using an equivalent amount of 17$\alpha$-[2'-furyl]-17$\beta$-hydroxy-5$\beta$-androstan-3-one, prepared as described in Example 1, instead of 17$\alpha$-[2'-furyl]-17$\beta$-hydroxy-5$\alpha$-androstan-3-one, 17$\beta$,24-epoxy-24 - hydroxy - 21 - nor-5$\beta$, 17$\alpha$-chol-22-ene-3,20-dione, M.P. 222–223° C., $[\alpha]_D = +89.6$ (CHCl$_3$) is obtained.

By following the Procedures A or B of Example 22 but using an equivalent amount of the appropriate starting material, the 17$\alpha$-[2'-furyl]-17$\beta$-hydroxy steroids described in Examples 2 to 15, instead of 17$\alpha$[2'-furyl]-17$\beta$-hydroxy-5$\alpha$-androstan-3-one, the compounds of Formula I, listed in Table IV, may be obtained. In each case the source of the appropriate starting material is noted by the example in which it is prepared.

TABLE IV

| Example | Number of example describing starting material | Product |
|---|---|---|
| 23 | 2 | 17$\beta$,24-epoxy-11$\alpha$,24-dihydroxy-21-nor-5$\alpha$,17$\alpha$-chol-22-ene-3,20-dione. |
| 24 | 3 | 17$\beta$-24-epoxy-11$\alpha$,24-dihydroxy-21-nor-5$\beta$,17$\alpha$-chol-22-ene-3,20-dine. |
| 25 | 4 | 17$\beta$,24-epoxy-11$\beta$,24-dihydroxy-21-nor-5$\alpha$,17$\alpha$-chol-22-ene-3,20-dione. |
| 26 | 5 | 17$\beta$,24-epoxy-11$\beta$,24-dihydroxy-21-nor-5$\beta$,17$\alpha$-chol-22-ene-3,20-dione. |
| 27 | 6 | 17$\beta$,24-epoxy-24-hydroxy-19,21-dinor-5$\alpha$,17$\alpha$-chol-22-ene-3,20-dione. |
| 28 | 7 | 17$\beta$,24-epoxy-24-hydroxy-19,21-dinor-5$\beta$,17$\alpha$-chol-22-ene-3,20-dione. |
| 29 | 8 | 17$\beta$,24-epoxy-11$\alpha$,24-dihydroxy-19,21-dinor-5$\alpha$,17$\alpha$-chol-22-ene-3,20-dione. |
| 30 | 9 | 17$\beta$,24-epoxy-11$\alpha$,24-dihydroxy-19,21-dinor-5$\beta$,17$\alpha$-chol-22-ene-3,20-dione. |
| 31 | 10 | 17$\beta$,24-epoxy-11$\beta$,24-dihydroxy-19,21-dinor-5$\alpha$,17$\alpha$-chol-22-ene-3,20-dione. |
| 32 | 11 | 17$\beta$,24-epoxy-11$\beta$,24-dihydroxy-19,21-dinor-5$\beta$,17$\alpha$-chol-22-ene-3,20-dione. |
| 33 | 12 | 17$\beta$,24-epoxy-24-hydroxy-21-nor-5$\alpha$,17$\alpha$-chol-22-ene-3,11,20-trione. |
| 34 | 13 | 17$\beta$,24-epoxy-24-hydroxy-21-nor-5$\beta$,17$\alpha$-chol-22-ene-3,11,20-trione. |
| 35 | 14 | 17$\beta$,24-epoxy-24-hydroxy-19,21-dinor-5$\alpha$,17$\alpha$-chol-22-ene-3,11,20-trione. |
| 36 | 15 | 17$\beta$,24-epoxy-24-hydroxy-19,21-dinor-5$\beta$,17$\alpha$-chol-22-ene-3,11,20-trione. |

EXAMPLE 37

17$\beta$,24-epoxy - 24 - hydroxy-21-nor-17$\alpha$-chola-4,22-diene-3,20-dione (I: R$^1$=H, R$^2$=CH, R$^3$=H$_2$, R$^4$=CH$_3$ and double bonds at positions 4,5 and 22,23)

Procedure A.—A solution of m-chloroperbenzoic acid (87%—41 g.) in chloroform (200 ml.) is added over a period of 30 minutes to a stirred solution of 17$\alpha$-[2'-furyl]-17$\beta$-hydroxyandrost-4-en-3-one (67 g.) prepared as described in Example 16, in chloroform (1000 ml.). After stirring for 2½ hours at room temperature, ether is added. The solution is extensively washed with sodium bicarbonate, then with water, dried and evaporated to dryness. The residue is suspended in acetone; the insoluble material is filtered, washed with acetone to yield the title compound, M.P. 241–243° C., $[\alpha]_D$ +139° (CHCl$_3$)

$\lambda_{max.}^{EtOH}$ 238 m$\mu$ ($\epsilon = 17,300$)

after crystallization from methylene chloride-acetone.

Procedure B.—The title compound may be obtained also in the following manner. N-bromosuccinimide (220 mg.) is added by portions to a mixture of 17$\alpha$-[2'-furyl]-17$\beta$-hydroxyandrost-4-en-3-one (400 mg.), prepared as described in Example 16, in methanol (20 ml.) and water (16 ml.). After stirring for ten minutes at room temperature, the solution is poured into a saturated solution of sodium bicarbonate and extracted with ether. The ether is washed to neutrality, dried and evaporated to dryness. The residue is crystallized successively with ether then acetone yielding the title compound, identical to the product obtained in above Procedure A.

By following the Procedures A or B of Example 37 but using an equivalent amount of the appropriate starting material, the 17$\alpha$-[2'-furyl]-17$\beta$-hydroxy steroids described in Examples 17 and 18 instead of 17$\alpha$-[2'-furyl]-17$\beta$-hydroxyandrost-4-en-3-one, the compounds of Formula I, listed in Table V, are obtained. In each case the appropriate starting material is noted by the example in which it is prepared.

TABLE V

| Ex. | Number of example describing starting material | Product | M.P., °C. |
|---|---|---|---|
| 38 | 17 | 17$\beta$,24-epoxy-11$\beta$,24-dihydroxy-21-nor-17$\alpha$-chola-4,22-diene-3,20-dione. | 199–200 |
| 39 | 18 | 17$\beta$,24-epoxy-24-hydroxy-19,21-dinor-17$\alpha$-chola-4,22-diene-3,20-dione. | 263–237 |

EXAMPLE 40

In the same manner as described for Procedures A or B of Example 37 but usig an equivalent amount of 17$\alpha$-[2'-furyl]-11$\alpha$,17$\beta$-dihydroxyandrost-4-en-3-one, 17$\alpha$-[2'-furyl]-11$\alpha$,17$\beta$-dihydroxyestr-4-ene-3-one or 17$\alpha$-[2'-furyl] - 11$\beta$,17$\beta$ - dihydroxyestr-4-en-3-one, described in Example 19, 17$\alpha$-[2'-furyl]-17$\beta$-hydroxyandrost-4-ene-3,11-dione, described in Example 20, or 17$\alpha$-[2'-furyl]-17$\beta$-hydroxyestr-4-ene-3,11-dione, described in Example 21, instead of 17$\alpha$-[2'-furyl]-17$\beta$-hydroxyandrost-4-en-3-one, the following compounds of Formula I may be obtained, respectively:

17$\beta$,24-epoxy-11$\alpha$,24-dihydroxy-21-nor-17$\alpha$-chola-4,22-diene-3,20-dione, 17$\beta$,24-epoxy-11$\alpha$,24-dihydroxy-19,21-dinor-17$\alpha$-chola-4,22-diene-3,20-dione, 17$\beta$,24-epoxy-11$\beta$,24-dihydroxy-19,21-dinor-17$\alpha$-chola-4,22-diene-3,20-dione, 17$\beta$,24-epoxy-24-hydroxy-21-nor-17$\alpha$-chola-4,22-diene-3,11,20-trione, and 17$\beta$,24-epoxy-24-hydroxy-19,21-dinor-17$\alpha$-chola-4,22-diene-3,11,20-trione.

EXAMPLE 41

17$\beta$,24-epoxy-24-hydroxy-21-nor-17$\alpha$-chola - 4,22 - diene-3,11,20-trione 24-acetate (I: R$^1$=H, R$^2$=OCOCH$_3$, R$^3$=O, R$^4$=CH$_3$ and double bond at positions 4,5 and 22,23)

A solution of 17$\beta$,24-epoxy-24-hydroxy-21-nor-17$\alpha$-chola-4,22-diene-3,11,20-trione (10 g.), prepared as described in Example 40, in pyridine (100 ml.) and acetic anhydride (100 ml.) is stirred at room temperature for one hour. The solution is poured into ice-water and the resulting solid is collected and washed with water. This solid is dissolved in a mixture of ether and methylene chloride. The solution is washed with dilute sulfuric acid, sodium bicarbonate and water to neutrality. After drying the solution, the solvents are removed under reduced pressure. The residue is chromatographed on silica gel. The eluant is 25% ethyl acetate-benzene. Fractions 6–9 are crystallized from methanol and then acetone-hexane to yield the title compound, M.P. 181–183° C., $[\alpha]_D = +206.8°$ (CHCl$_3$).

EXAMPLE 42

By following the procedure of Example 41 and using the appropriate acylating agent, for instance, acetic, propionic, butyric, hexanoic or heptanoic anhydride, together with the appropriate starting material selected from the products of Examples 22 to 40, inclusive, then the corresponding 24-acylates, for instance, the 24-acetates, the 24-propionates, the 24-butyrates, the 24-hexanoates or the 24-heptanoates, of the products of Examples 22–40 may be obtained.

EXAMPLE 43

17β,24-epoxy-24-hydroxy-21-nor-17α-chola - 4,22 - diene-3,20-dione 24-methyl ether (I: R$^1$=H, R$^2$=OCH$_3$, R$^3$=H$_2$, R$^4$=CH$_3$ and double bonds at positions 4,5, and 22,23)

A suspension of 17β,24-epoxy-24-hydroxy-21-nor-17α-chola-4,22-dien-3,20-dione (500 mg.), methanol (20 ml.) and a 70% solution of perchloric acid (0.5 ml.) is stirred at room temperature for 60 minutes. The solid goes rapidly in solution. The solution is diluted with water and extracted with ether. The ether is washed with sodium bicarbonate and water to neutrality, dried and evaporated to dryness. The residue is purified by chromatography on silica gel. Elution with benzene-ethyl acetate (9:1) and crystallization from acetone-hexane affords the title compound, M.P. 135–138° C.

EXAMPLE 44

By following the procedure of Example 43 and using the appropriate lower alkanol, for instance, methanol, ethanol or propanol, together with the appropriate starting material selected from the products of Examples 22 to 40, inclusive, then the corresponding 24-lower alkoxy derivatives, for instance the 24-methyl ethers, the 24-ethyl ethers, or the 24-propyl ethers, of the products of Examples 22–40 may be obtained.

EXAMPLE 45

17β-hydroxy-3,20-dioxo-21-nor-5α,17α-chol-22-enoic acid δ-lactone (I: R$^1$ and R$^2$=O, R$^3$=H$_2$, R$^4$=CH$_3$ and a double bond at position 22,23)

An 8 N chromic acid solution (37 ml., see A. Bowers et al., cited above) is added over a period of 10 minutes to a stirred solution of 17β,24-epoxy-24-hydroxy-21-nor-5α,17α-chol-22-ene-3,20-dione (28.2 g.), prepared as described in Example 22, acetone (1410 ml.). After stirring for 20 minutes, the excess oxidant is destroyed by the addition of isopropanol. Water is added and most of the acetone is evaporated under reduced pressure. The solid is collected, washed with water and dried. Crystallization from methylene chloride-methanol affords the title compound, M.P. 246–247° C., $[\alpha]_D = +158°$ (CHCl$_3$), $\lambda_{max.}^{EtOH}$ 219 mµ (ε=11,900) and 360 mµ (ε=156)

In the same manner but using an equivalent amount of 17β,24-epoxy - 24 - hydroxy-21-nor-5β,17α-chol-22-ene-3, 20-dione, prepared as described in Example 22, instead of 17β,24-epoxy - 24 - hydroxy-21-nor-5α,17α-chol-22-ene-3, 20-dione, 17β-hydroxy-3,20-dioxo-21-nor-5β,17α-chol-22-enoic acid δ-lactone, M.P. 276–279° C., $[\alpha] = +151.3°$ (CHCl$_3$), is obtained.

By following the procedure of Example 45 but using an equivalent amount of the appropriate starting material, the compounds of Formula I in which R$^1$ is the hydroxyl group and R$^2$ is two hydrogen atoms or a ketonic oxygen, instead of 17β,24-epoxy-24-hydroxy-21-nor-5α, 17α-chol-22-ene-3,20-dione, the corresponding compounds of Formula I in which R$^1$ and R$^2$ both represent a ketonic oxygen, listed in Table VI, may be obtained. In each case the source of the appropriate starting material is noted by the example in which it is prepared.

TABLE VI

| Example | Number of example describing starting material | Product |
| --- | --- | --- |
| 46 | 27 | 17β-hydroxy-3,20-dioxo-19,21-dinor-5α,17α-chol-22-enoic acid α-lactone. |
| 47 | 28 | 17β-hydroxy-3,20-dioxo-19,21-dinor-5β,17α-chol-22-enoic acid α-lactone. |
| 48 | 33 | 17β-hydroxy-3,11,20-trioxo-21-nor-5α,17α-chol-22-enoic acid α-lactone. |
| 49 | 34 | 17β-hydroxy-3,11,20-trioxo-21-nor-5α,17α-chol-22-enoic acid α-lactone. |
| 50 | 35 | 17β-hydroxy-3,11,20-trioxo-19,21-dinor-5α,17α-chol-22-enoic acid α-lactone. |
| 51 | 36 | 17β-hydroxy-3,11,20-trioxo-19,21-dinor-5β,17α-chol-22-enoic acid α-lactone. |

EXAMPLE 52

17β-hydroxy-3,20-dioxo-21-nor-17α-chola - 4,22 - dienoic acid δ-lactone (I: R$^1$ and R$^2$=O, R$^3$=H$_2$, R$^4$=CH$_3$ and double bonds at positions 4,5 and 22,23)

An 8 N chromic acid solution (57 ml., see A Bowers et al., cited above) is added to a stirred suspension of 17β, 24 - epoxy-24-hydroxy-21-nor-17α-chola - 4,22 - diene-3, 20-dione (43 g.), prepared as described in Example 37, in acetone (2100 ml.). The mixture is stirred for 20 minutes and then the excess oxidant is destroyed by isopropanol. The acetone is evaporated and the residue suspended in water. The solid is collected, washed with water and dried, yielding the title compound, of suitable quality for further use.

Part of the material is purified by chromatography on silica gel. The product is eluted with 10% ethyl acetate-benzene. Crystallization from acetone-hexane yielded the pure title compound, M.P. 192–193° C., $[\alpha]_D = +251.4°$, $\lambda_{max.}^{EtOH}$ 235 mµ (ε=19,400)

In the same manner but using an equivalent amount of 17β,24-epoxy - 24 - hydroxy-19,21-dinor-17α-chola-4,22-diene-3,20-dione, prepared as described in Example 39, instead of 17β,24-epoxy-24-hydroxy-21-nor-17α-chola-4,22-diene, 17β - hydroxy-3,20-dioxo-19,21-dinor-17α-chola-4, 22-dienoic acid δ-lactone, M.P. 276–277° C., is obtained.

EXAMPLE 53

17β - hydroxy-3,11,20-trioxo-21-nor - 17α - chola-4,22-dienoic acid δ-lactone (I: R$^1$, R$^2$ and R$^3$=O, R$^4$=CH$_3$ and double bonds at positions 4,5 and 22,23)

An 8 N chromic acid solution (84 ml., see A. Bowers et al., cited above) is added to a 17β,24-epoxy-24-hydroxy-21-nor-17α-chola-4,22-diene-3,11,20-trione (52 g.), prepared as described in Example 40, in acetone (3640 ml.). The mixture is stirred for 2 hours at room temperature. Isopropanol (50 ml.) is added to destroy the excess oxidant. Water is added and most of the acetone is removed under reduced pressure. The resultant solid is collected, washed with water and dried. This solid is chromatographed on silica gel. Elution with 35% ethyl acetate-benzene and crystallization of the eluate from methylene chloride-methanol gives the title compound, M.P. 261–262° C. $[\alpha]_D +309.7°$ (CHCl$_3$).

In the same manner but using an equivalent amount of 17β,24 - epoxy-24-hydroxy-19,21-dinor-17α-chola-4,22-diene-3,11,20-trione, prepared as described in Example 40, instead of 17β,24-epoxy-24-hydroxy-21-nor-17α-chola-4,22-diene-3,11,20-trione, 17β-hydroxy-3,11,20-trioxo-19, 21-dinor-17α-chola-4,22-dienoic acid δ-lactone is obtained.

EXAMPLE 54

11β,17β-dihydroxy-3,20-dioxo-21-nor - 17α - chola-4,22-dienoic acid δ-lactone (I: R¹ and R²=O, R³=OH and H, R⁴=CH₃ and double bonds at positions 4,5 and 22,23)

A mixture of 17β,24 - epoxy-11β,24-dihydroxy-21-nor-17α-chola-4,22-diene-3,20-dione (8 g.), prepared as described in Example 38, chloroform (320 ml.) and activated manganese dioxide (40 g.) are refluxed for 15 minutes. After cooling, the inorganic material is collected on a filter and washed with chloroform. The filtrate is evaporated to dryness. The residue is chromatographed on silica gel. The fractions eluted with 35% ethyl acetate-benzene are crystallized from a mixture of chloroform-acetone-hexane to give the title compound, M.P. 270–273° C., [α]$_D$=+295.8° (CHCl₃).

By following the procedure of Example 54 but using an equivalent amount of the appropriate starting material, the compounds of Formula I in which R² is the hydroxyl group and R³ is a hydroxyl group and a hydrogen, instead of 17β,24-epoxy-11β,24-dihydroxy-21-nor-17α-chola-4,22-diene-3,20-dione, the corresponding compounds of Formula I in which R¹ and R² both represent a ketonic oxygen, listed in Table VII, may be obtained. In each case the source of the appropriate starting material is noted by the example in which it is prepared.

TABLE VII

| Example | Number of example describing starting material | Product |
|---|---|---|
| 55 | 23 | 11α,17β-dihydroxy-3,20-dioxo-21-nor-5α,17α-chol-22-enoic acid δ-lactone. |
| 56 | 24 | 11α,17β-dihydroxy-3,20-dioxo-21-nor-5β,17α-chol-22-enoic acid δ-lactone. |
| 57 | 25 | 11β,17β-dihydroxy-3,20-dioxo-21-nor-5α,17α-chol-22-enoic acid δ-lactone. |
| 58 | 26 | 11β,17β-dihydroxy-3,20-dioxo-21-nor-5β,17α-chol-22-enoic-acid δ-lactone. |
| 59 | 29 | 11α,17β-dihydroxy-3,20-dioxo-19,21-dinor-5α,17α-chol-22-enoic acid δ-lactone. |
| 60 | 30 | 11α,17β-dihydroxy-3,20-dioxo-19,21-dinor-5β,17α-chol-22-enoic acid δ-lactone. |
| 61 | 31 | 11β,17β-dihydroxy-3,20-dioxo-19,21-dinor-5α,17α-chol-22-enoic acid δ-lactone. |
| 62 | 32 | 11β,17β-dihydroxy-3,20-dioxo-19,21-dinor-5β,17α-chol-22-enoic-acid δ-lactone. |

EXAMPLE 63

In the same manner as described for Example 54 but using an equivalent amount of 17β,24-epoxy-11β,24-dihydroxy-19,21-dinor-17α-chola-4,22-diene-3,20-dione, 17β,24-epoxy-11α,24-dihydroxy-21-nor-17α-chola-4,22-diene-3,20-dione or 17β,24-epoxy-11α,24-dihydroxy-19,21-dinor-17α-chola-4,22-diene-3,20-dione, prepared as described in Example 40, instead of 17β,24-epoxy-11β,24-dihydroxy-21-nor-17α-chola-4,22-diene-3,20-dione, 11β,17β-dihydroxy-3,20-dioxo-19,21-nor-17α-chola-4,22-dienoic acid δ-lactone, 11α,17β-dihydroxy-3,20-dioxo-21-nor-17α-chola-4,22-dienoic acid δ-lactone and 11α,17β-dihydroxy-3,20-dioxo-19,21-dinor-17α-chola-4,22-dienoic acid δ-lactone may be obtained respectively.

EXAMPLE 64

17β,24 - epoxy - 24 - hydroxy-21-nor-17α-chol-4-ene-3,20-dione (I: R¹=H, R²=OH, R³=H₂, R⁴=CH₃ and double bond at position 4,5)

A mixture of 17β,24 - epoxy - 24-hydroxy-21-nor-17α-chola-4,22-diene-3,20-dione (5.4 g.), prepared as described in Example 37, dioxane (320 ml.) and pre-hydrogenated 10% palladium on calcium, carbonate (1.35 g.) is hydrogenated at room temperature and normal pressure for 30 minutes. The catalyst is collected on a filter pad and the filtrate is concentrated to dryness. The residue is subjected to chromatography on silica gel. Elution with 30% ethyl acetate-benzene and recrystallization of the eluate from methylene chloride-acetone affords the title product,

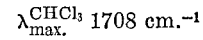 1708 cm.⁻¹

NMR (CDCl₃): 218, 235, 325 Hz.

By following the procedure of Example 64 but using an equivalent amount of the appropriate starting material, the compounds of Formula I in which R¹ represents hydrogen, R² represents the hydroxyl group, an esterified hydroxyl group as defined above, or an alkoxy group containing 1–3 carbon atoms, R³ and R⁴ are as defined in the first instance with an optional double bond at position 4,5 and a double bond at position 22,34 instead of 17β,24 - epoxy - 24 - hydroxy - 21-nor-17α-chloa-4,22-diene-3,20 - dione, the corresponding compound of Formula I in which the bond at position 22,23 is saturated, listed in Table VIII, are obtained. In each case the source of the appropriate starting material is noted by the Example in which it is prepared.

TABLE VIII

| Example | Number of example describing starting material | Product |
|---|---|---|
| 65 | ¹ 22 | 17β,24-epoxy-24-hydroxy-21-nor-5α,17α-cholane-3,20-dione. |
| 66 | ² 22 | 17β,24-epoxy-24-hydroxy-21-nor-5β,17α-cholane-3,20-dione. |
| 67 | 23 | 17β,24-epoxy-11α,24-dihydroxy-21-nor-5α,17α-cholane-3,20-dione. |
| 68 | 24 | 17β,24-epoxy-11α,24-dihydroxy-21-nor-5β,17α-cholane-3,20-dione. |
| 69 | 25 | 17β,24-epoxy-11β,24-dihydroxy-21-nor-5α,17α-cholane-3,20-dione. |
| 70 | 26 | 17β,24-epoxy-11β,24-dihydroxy-12-nor-5β,17α-cholane-3,20-dione. |
| 71 | 27 | 17β,24-epoxy-24-hydroxy-19,21-dinor-5α,17α-cholane-3,20-dione. |
| 72 | 28 | 17β,24-epoxy-24-hydroxy-19,21-dinor-5β,17α-cholane-3,20-dione. |
| 73 | 29 | 17β,24-epoxy-11α,24-dihydroxy-19,21-dinor-5α,17α-cholane-3,20-dione. |
| 74 | 30 | 17β,24-epoxy-11α,24-dihydroxy-19,21-dinor-5β,17α-cholane-3,20-dione. |
| 75 | 31 | 17β,24-epoxy-11β,24-dihydroxy-19,21-dinor-5α,17α-cholane-3,20-dione. |
| 76 | 32 | 17β,24-epoxy-11β,24-dihydroxy-19,21-dinor-5β,17α-cholane-3,20-dione. |
| 77 | 33 | 17β,24-epoxy-24-hydroxy-21-nor-5α,17α-cholane-3,11,10-trione. |
| 78 | 34 | 17β,24-epoxy-24-hydroxy-21-nor-5β,17α-cholane-3,11,20-trione |
| 79 | 35 | 17β,24-epoxy-24-hydroxy-19,21-dinor-5α,17α-cholane-3,11,20-trione. |
| 80 | 36 | 17β,24-epoxy-24-hydroxy-19,21-dinor-5β,17α-cholane-3,11,20-trione. |
| 81 | 38 | 17β,24-epoxy-11β,24-dihydroxy-12-nor-17α-chol-4-ene-3,20-dione. |
| 82 | 39 | 17β,24-epoxy-24-hydroxy-19,21-dinor-17α-chol-4-ene-3,20-dione. |
| 83 | 41 | 17β,24-epoxy-24-hydroxy-21-nor-17α-chol-4-ene-3,11,20-trione 24-acetate. |
| 84 | 43 | 17β,24-epoxy-24-hydroxy-21-nor-17α-chol-4-ene-3,20-dione 24 methyl ether. |

¹ (5α-isomer).
² (5β-isomer).

17β,24 - epoxy - 11α,24 - dihydroxy-21-nor-17α-chol-4-ene - 3,20 - dione, 17β,24-epoxy-11α,24-dihydroxy-19,21-dinor - 17α - chol-4-ene-3,20-dione, 17β,24-epoxy-11β,24-dihydroxy- 19,21-dinor-17α-chol-4-ene-3,20-dione,17β,24-epoxy - 24-hydroxy-21-nor-17α-chol-4-ene-3,11,20-trione, 17β,24 - epoxy-24-hydroxy-19,21-dinor-17α-chol - 4 - ene-3,11,20-trione, the 24 acylates, for instance, the 24-acetates, the 24-propionates, the 24-butyrates, the 24-hexanoates, or the 24-heptanoates, of the product of Examples 64 to 82, and the 24-methyl ethers, the 24-ethyl ethers and the 24-propyl ethers of the products of Examples 64–82, may be obtained by following the procedure of Example 64 but using an equivalent amount of the corresponding derivatives containing the double bond at position 22,23, described respectively in Example 40, 42 and 44, instead of 17β,24-epoxy-24-hydroxy-21-nor-17α-chola-4,22-diene-3,20-dione.

EXAMPLE 86

17β - hydroxy - 3,20 - dioxo - 21 - nor - 5β,17α - cholanoic acid δ-lactone (I: R¹ and R²=O, R³=H₂, R⁴=CH₃ and 22,23 bond is saturated)

A mixture of 17β-hydroxy-3,20-dioxo-21-nor-5β,17α-chol-22-enoic acid δ-lactone (19.6 g.), prepared as described in Example 45, acetic acid (980 ml.) and zinc dust (98 g.) is stirred for 75 minutes at room temperature. The zinc is collected, washed with acetic acid and water. The filtrate is diluted with water. The resulting solid is collected, washed with water and dried. This solid is crystallized from methylene chloride-methanol giving the title compound of suitable quality for further use. Part of this solid is chromatographed on silica gel. Elution with 30% ethyl acetate-benzene affords the pure title compound, M.P. 234–236° C., [α]$_D$=+54.8°.

In the same manner but using an equivalent amount of 17β - hydroxy - 3,20-dioxo - 21 - nor-5α-chol-22-enoic acid δ-lactone, described in Example 45, instead of 17β-hydroxy - 3,20 - dioxo - 21 - nor-5β-chol-22-enoic acid δ-lactone, 17β - hydroxy - 3,20 - dioxo - 21 - nor - 5α,17α-cholanoic acid δ-lactone, M.P. 216–217° C., [α]$_D$= +63.5° (CHCl₃), is obtained.

By following the procedure of Example 86 but using an equivalent amount of the appropriate starting material, the compounds of Formula I in which R¹ and R²=O, instead of 17β - hydroxy - 3,20 - dioxo - 21-nor-5β-chol-22-enoic acid δ-lactone, the compounds of Formula I in which R¹ and R²=O and the 22,23 bond is saturated, listed in Table IX, may be obtained. In each case the source of the appropriate starting material is noted by the example in which it is prepared.

TABLE IX

| Example | Number of example describing starting material | Product |
|---|---|---|
| 87 | 46 | 17β-hydroxy-3,20-dioxo-19,21-dinor-5α,17α-cholanoic acid δ-lactone. |
| 88 | 47 | 17β-hydroxy-3,20-dioxo-19,21-dinor-5β,17α-cholanoic acid δ-lactone. |
| 89 | 48 | 17β-hydroxy-3,11,20-trioxo-21-nor-5α,17α-cholanoic acid δ-lactone. |
| 90 | 49 | 17β-hydroxy-3,11,20-trioxo-21-nor-5β,17α-17α-cholanic acid δ-lactone. |
| 91 | 50 | 17β-hydroxy-3,11,20-trioxo-19,21-dinor-5α,17α-cholanoic acid δ-lactone. |
| 92 | 51 | 17β-hydroxy-3,11,20-trioxo-19,21-dinor-5β,17α-cholanoic acid δ-lactone. |
| 93 | 55 | 11α,17β-dihydroxy-3,20-dioxo-21-onr-5α,17α-cholanoic acid δ-lactone. |
| 94 | 56 | 11α,17β-dihydroxy-3,20-dioxo-21-nor-5β,17α-cholanoic acid δ-lactone. |
| 95 | 57 | 11β,17β-dihydroxy-3,20-dioxo-21-nor-5α,17α-cholanoic acid δ-lactone. |
| 96 | 58 | 11β,17β-dihydroxy-3,20-dioxo-21-nor-5β,17α-cholanoic acid δ-lactone. |
| 97 | 59 | 11α,17β-dihydroxy-3,20-dioxo-19,21-dinor-cholanoic acid δ-lactone. |
| 98 | 60 | 11α,17β-dihydroxy-3,20-dioxo-19,21-dinor-5β,17α-cholanoic acid δ-lactone. |
| 99 | 61 | 11β,17β-dihydroxy-3,20-dioxo-19,21-dinor-5α-17α-cholanoic acid δ-lactone. |
| 100 | 62 | 11β,17β-dihydroxy-3,20-dioxo-19,21-dinor-5β,17β-cholanoic acid δ-lactone. |

EXAMPLE 101

17β - hydroxy - 3,20 - dioxo - 19,21 - dinor - 17α - chol-4-enoic acid δ-lactone (I: R¹ and R²=O, R³=H₂, R⁴=H, double bond at position 4,5 and 22,23 bond is saturated).

A mixture of 17β-hydroxy-3,20-dioxo-19,21-dinor-17α-chola-4,22-dienoic acid δ-lactone (18 g.), prepared as described in Example 52, acetic acid (900 ml.) and zinc dust (90 g.) is stirred at room temperature for 60 minutes. The zinc is collected and washed with acetic acid and water. The filtrate is diluted with water. The resulting solid is collected, washed with water and dried. This solid is chromatographed on Silica gel. The fractions eluted with 25% ethyl acetate-benzene are combined and crystallized from methylene chloride-methanol to yield the pure title compound, M.P. 226–227° C., [α]$_D$= +89.8°, $\lambda^{EtOH}_{max.}$ 240 mμ (ε=17,500)

By following the procedure of Example 101 but using an equivalent amount of the appropriate starting material, the compounds of Formula I in which R¹ and R²=O, instead of 17β-hydroxy-3,20-dioxo-19,21-dinor-17α-chola-4,22-dienoic acid δ-lactone, the compounds of Formula I in which R¹ and R²=O and the 22,23 bond is saturated, listed in Table X, may be obtained. In each case the source of the appropriate starting material is noted by the Example in which it is prepared.

TABLE X

| Ex. | Number of example describing starting material | Product | M.P. °C. |
|---|---|---|---|
| 102 | ¹ 52 | 17β-hydroxy-3,20-dioxo-21-nor-17α-chol-4-enoic acid δ-lactone. | 213–214 |
| 103 | 54 | 11β,17β-dihydroxy-3,20-dioxo-21-nor-17α-chol-4-enoic acid δ-lactone. | 264–267 |
| 104 | ¹ 53 | 17β-hydroxy-3,11,20-trioxo-21-nor-17α-chol-4-enoic acid δ-lactone. | 228–230 |

¹ Title compound.

EXAMPLE 105

In the same manner as described for Example 101 but using an equivalent amount 11α,17β-dihydroxy-3,20-dioxo-21-nor-17α-chola-4,22-dienoic acid δ-lactone, 11α, 17β-dihydroxy-3,20 - dioxo-19,21-dinor-17α - chola-4,22-dienoic acid δ-lactone, 11β,17β-dihydroxy-3,20-dioxo-19, 21-dinor-17α-chola-4,22-dienoic acid δ-lactone, described in Example 63, or 17β-hydroxy-3,11,20-trioxo-19,21-dinor-17α-chola-4,22-dienoic acid δ-lactone, described in Example 53, instead of 17β-hydroxy-3,20-dioxo-19,21-dinor-17α-chola-4,22-dienoic acid δ-lactone, the following compounds of Formula I in which R¹ and R²=O and the 22,23 bond is saturated may be obtained, respectively:

11α,17β-dihydroxy-3,20-dioxo-21-nor-17α-chol-4-enoic acid δ-lactone,

11α,17β-dihydroxy-3,20-dioxo-19,21-dinor-17α-chol-4-enoic acid δ-lactone,

11β,17β-dihydroxy-3,20-dioxo-19,21-dinor-17α-chol-4-enoic acid δ-lactone, and

17β-hydroxy-3,11,20-trioxo-19,21-dinor-17α-chol-4-enoic acid δ-lactone.

I claim:
1. A compound selected from those of the formula

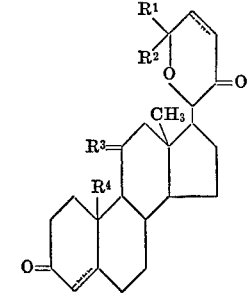

wherein R¹ and R² together represent ketonic oxygen, or R¹ represents hydrogen and R² represents hydroxyl, an esterified hydroxyl in which the ester-forming group is an aliphatic acid group containing from two to seven carbon atoms, or an alkoxy group containing from one to three carbon atoms; R³ represents two atoms of hydrogen, hydroxyl and a hydrogen atom, or ketonic oxygen; R⁴ represents hydrogen or methyl; and an optional double bond, signified by a dotted line, may be present at position 4,5 or at position 22,23, or at both said positions.

2. 17β,24-epoxy-24 - hydroxy - 21-nor-5α,17α-chol-22-ene-3,20-dione, as claimed in claim 1.

3. 17β,24-epoxy-24-hydroxy - 21 - nor-5β,17α-chol-22-ene-3,20-dione, as claimed in claim 1.

4. 17β,24-epoxy-24-hydroxy - 21 - nor 17α-chola-4,22-diene-3,20-dione, as claimed in claim 1.

5. 17β,24-epoxy-11β,24-dihydroxy - 21 - nor-17α-chola-4,22-diene-3,20-dione, as claimed in claim 1.

6. 17β-24-epoxy-24-hydroxy-19,21 - dinor-17α-chola-4,22-diene-3,20-dione, as claimed in claim 1.

7. 17β,24-epoxy-24-hydroxy - 21-nor - 17α-chola-4,22-diene-3,11,20-trione, as claimed in claim 1.

8. 17β,24-epoxy-24-hydroxy - 21 - nor-17α-chola-4,22-diene-3,11,20-trione 24-acetate, as claimed in claim 1.

9. 17β,24-epoxy-24-hydroxy - 21 - nor-17α-chola-4,22-diene-3,20-dione 24-methyl ether, as claimed in claim 1.

10. 17β-hydroxy-3,20-dioxo-2-nor - 5α,17α - chol-22-enoic acid δ-lactone, as claimed in claim 1.

11. 17β-hydroxy-3,20-dioxo-21 - nor - 5β,17α-chol-22-enoic acid δ-lactone, as claimed in claim 1.

12. 17β-hydroxy-3,20-dioxo-21-nor - 17α - chola-4,22-dienoic acid δ-lactone, as claimed in claim 1.

13. 17β-hydroxy-3,11,20-trioxo-21 - nor - 17α-chola-4,22-dienoic acid δ-lactone, as claimed in claim 1.

14. 11β,17β-dihydroxy-3,20-dioxo - 21-nor-17α-chola-4,22-dienoic acid δ-lactone, as claimed in claim 1.

15. 17β,24-epoxy-24-hydroxy-21 - nor - 17α-chola-4-ene-3,20-dione, as claimed in claim 1.

16. 17β-hydroxy-3,20-dioxo-21-nor - 5β,17β-cholanoic acid δ-lactone, as claimed in claim 1.

17. 17β-hydroxy-3,20-dioxo-21 - nor - 5α,17α-cholanoic acid δ-lactone, as claimed in claim 1.

18. 17β-hydroxy-3,20-dioxo-19,21 - dinor - 17α-cholan-4-enoic δ-lactone, as claimed in claim 1.

19. A compound selected from those of the formula

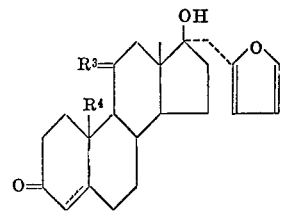

wherein $R^3$ represents two atoms of hydrogen, a hydroxyl and one atom of hydrogen, or ketonic oxygen; $R^4$ represents hydrogen or methyl; and an optional double bond may be present at position 4,5 as signified by the dotted line extending between these positions.

20. 17α-[2'-furyl]-17β - hydroxy - 5α-androstan-3-one, as claimed in claim 19.

21. 17α-[2'-furyl]-17β - hydroxy - 5β-androstan-3-one, as claimed in claim 19.

22. 17α-[2'-furyl]-17β - hydroxyandrost - 4-en-3-one, as claimed in claim 19.

23. 17α-[2'-furyl]-11β,17 - dihydroxyandrost - 4-en-3-one, as claimed in claim 19.

24. 17α-[2'-furyl]-17β - hydroxyestr - 4-en-3-one, as claimed in claim 19.

25. 17α-[2'-furyl]-17β - hydroxyandrost - 4-ene-3,11-dione, as claimed in claim 19.

References Cited
UNITED STATES PATENTS
3,432,486   3/1969   Minato _____ 260—210.5

HENRY A. FRENCH, Primary Examiner

U.S. Cl. X.R.
260—239.5, 239.57, 999

PO-1050
(5/69)

UNITED STATES PATENT OFFICE
CERTIFICATE OF CORRECTION

Patent No. 3,657,226  Dated April 18, 1972

Inventor(s)  Yvon Lefebvre    -1-

It is certified that error appears in the above-identified patent and that said Letters Patent are hereby corrected as shown below:

Column 1, Formula I should read --

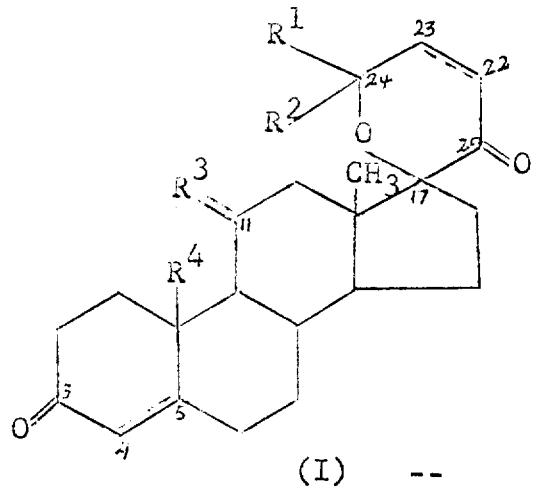

(I) --

Column 14, Formula of Claim 1, should read --

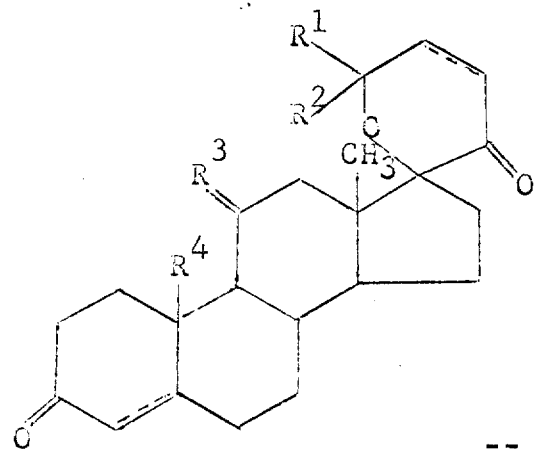

--

PO-1050
(5/69)

UNITED STATES PATENT OFFICE
CERTIFICATE OF CORRECTION

Patent No. 3,657,226          Dated  April 18, 1972

Inventor(s)   Yvon Lefebvre                - 2 -

It is certified that error appears in the above-identified patent and that said Letters Patent are hereby corrected as shown below:

Column 15, Claim 10, line 18 "3,20-dioxo-2-nor" should read --3,20-dioxo-21-nor--

Column 15, Claim 16, line 31 "21-nor-5β,17β-cholanoic" should read --21-nor-5β,17α-cholanoic--

Column 16, Formula of Claim 19, should read --

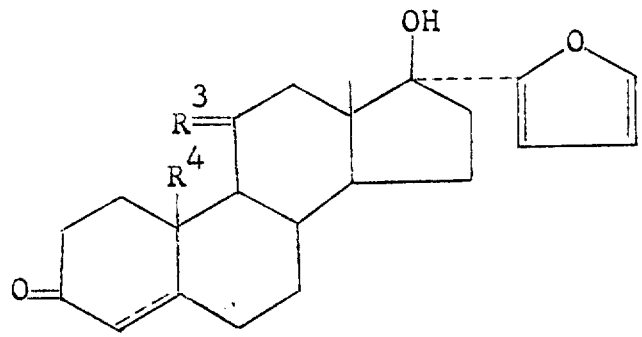

Signed and sealed this 10th day of April 1973.

(SEAL)
Attest:

EDWARD M. FLETCHER, JR.            ROBERT GOTTSCHALK
Attesting Officer                  Commissioner of Patents